United States Patent
Morris

[15] 3,666,711
[45] May 30, 1972

[54] PRODUCTION OF FIBER REINFORCED RESIN COMPOSITES

[72] Inventor: Carolyn Ethel Mary Morris, Runcorn, England

[73] Assignee: Imperial Chemical Industries Limited, London, England

[22] Filed: Mar. 10, 1970

[21] Appl. No.: 18,302

[30] Foreign Application Priority Data

Mar. 14, 1969 Great Britain......................13,576/69

[52] U.S. Cl.............................................................260/38
[51] Int. Cl..........................................................C08g 51/10
[58] Field of Search....................260/38, 2.5 F; 117/126 GQ

[56] References Cited

UNITED STATES PATENTS

| | | | |
|---|---|---|---|
| 2,804,438 | 8/1957 | Biefeld et al. | 260/38 |
| 3,118,807 | 1/1964 | Holcomb | 260/38 |
| 3,484,391 | 12/1969 | Wheatley et al. | 260/38 |

*Primary Examiner*—Lewis T. Jacobs
*Attorney*—Cushman, Darby & Cushman

[57] ABSTRACT

The properties of glass fiber reinforced phenolic resin composites are improved by treating the glass fiber prior to the formation of the composite with a specified alcohol, ketone, alkylbenzene or o-amino(alkylbenzene) which improves the wetting of the glass by the resin. The invention is particularly applicable to the production of glass fiber reinforced foamed phenolic resin.

8 Claims, No Drawings

PRODUCTION OF FIBER REINFORCED RESIN COMPOSITES

This invention relates to the production of fiber reinforced resin composites and in particular to the production of glass fiber reinforced phenolic resins, and to the composites so obtained.

The stiffness of articles moulded from phenolic resins may be improved by the incorporation of glass fibers which may be, for example, in the form of woven or unwoven mats, tissues, rovings, strands or chopped fibers. However, it has been found difficult to obtain good adhesion of these resins to the fiber because of the poor wetting of the glass by the uncured resin (sometimes referred to as prepolymer). As a consequence the physical strength and particularly the flexural modulus, of the composites suffers, and also delamination tends to occur at the glass resin interface under load. This shortcoming can be overcome to some extent by subjecting the viscous composite of glass fiber and uncured resin (or prepolymer) to pressure during curing but for obvious reasons this solution is not practicable when it is intended to foam the resin to obtain a fiber reinforced foamed resin composite. Much research has been directed towards the alleviation of this shortcoming and in general attention has been focussed on developing a size for the glass fiber that is also compatible with the resin with which the glass fiber is to be used. We have now found a method of treating glass fiber to improve its wetting by uncured phenolic resins which avoids the need for special sizes.

According to our invention, in the production of a glass fiber reinforced phenolic resin composite by forming a composite of glass fibers and uncured resin composition (prepolymer composition) and curing the resin (prepolymer), the glass fibers are first moistened with an organic compound (hereinafter referred to as a wetting promoter) having the formula $CH_3X$ where X is —ROH, —CO·R', or —RY where R is a direct link or an alkylene group having from one to three carbon atoms, R' is an alkyl group having from one to four carbon atoms and Y is phenyl or o-aminophenyl.

By phenolic resins we mean the resins of known kind based on the reaction products of formaldehyde, or formaldehyde generators, e.g. paraformaldehyde and hexamethylene tetramine, with aromatic compounds containing at least one phenolic hydroxyl group and at least two carbon atoms positioned ortho and/or para to the hydroxyl group which carry hydrogen atoms available for substitution. The resins may be of the novolak or resole type. Thus the uncured resin (prepolymer) may be of the novolak kind prepared by reacting excess phenolic compound with formaldehyde in acid conditions, or of the acid-curable resole kind prepared by reacting excess formaldehyde with phenolic compound under basic conditions.

Examples of wetting promoters for the glass fibers are alcohols having from one to four carbon atoms, e.g. methanol, isopropanol and isobutanol; methyl alkyl ketones where the alkyl group has up to four carbon atoms e.g. acetone and methyl isobutyl ketone; and alkylbenzenes and o-amino(alkylbenzenes) wherein the alkyl group has from one to four carbon atoms, e.g. toluene, cumene and o-toluidine. It is preferred that the wetting promoter is also a non-solvent for the uncured resin (or prepolymer) with which the glass fibers are to be combined. Preferably, therefore, the compound is an alkylbenzene, especially toluene or cumene. Where it is desired to obtain a foamed resin composite, i.e. where the uncured resin (or prepolymer) composition is a nascent foam composition, it is further preferred that the wetting promoter is one which when used to moisten a flat surface of E glass gives a contact angle of from 10° to 20° between a drop of nascent foam composition and the E glass. Wetting agents giving contact angles below 10° tend to promote an undesirably high rate of escape of the blowing agent while those giving angles greater than 20° are less efficient as wetting promoters. Cumene and toluene are both suitable in this respect.

It is also preferred that the boiling point of the wetting promoter is such that the promoter is volatilised during cure. Where it is not intended to obtain a foamed product, the boiling point of the wetting promoter is preferably low enough to allow the promoter to volatilise while the viscosity of the resin is still sufficiently low to allow it to escape through the resin.

The glass fibers may be used in any desired form, e.g. as individual fibers, as bundles or strands of fibers, as rovings, as woven or unwoven textiles, e.g. mats or tissues, or in the form of chopped fibers. The presence or absence of a size on the glass and the nature of the size, if any, appears to be immaterial.

The fibers may be moistened with the wetting promoter by immersing them in a bath of the promoter or by passing them through vapours from the promoter or by spraying. The required uptake of wetting promoter depends upon the nature of the resin and the form of the glass fibers but in general it is preferred to avoid increasing the weight of the glass fibers by more than 50 percent and preferably by more than 40 percent. In general, an uptake of 10 to 25 percent by weight is satisfactory although even less, e.g. down to 5 percent, may be used if desired.

Composites may be produced from long lengths of glass fiber, for example, by passing the fiber through a bath of the wetting promoter, removing excess of the promoter e.g. by a hot air blast and/or wiping, coating the treated fiber with uncured resin (prepolymer) and then placing lengths of the coated fiber in a mould and heating to sure the resin (prepolymer), preferably under applied pressure. Laminates may be formed by spraying a woven or unwoven glass fiber web with wetting promoter to obtain the desired uptake thereof, placing the treated web in a mould, and adding a layer of uncured resin (prepolymer). Further althernate layers of treated glass fiber web and uncured resin (prepolymer) may be added, as necessary, until the desired thickness of the articles is obtained. The laminate may then be heated to cure the resin (prepolymer), preferably under applied pressure. The processes may be operated continuously, if desired.

The process of the invention is particularly suitable for the production of glass-fiber reinforced foamed resin composites. In accordance with this embodiment a wetting promoter which has a boiling point similar to that of the blowing agent used in the nascent foam composition is preferably used. Composites having very useful properties may be ovtained by placing in a mould alternate layers of treated unwoven or woven glass fiber web and nascent foam composition and then heating to foam and cure the resin.

The uncured resin (prepolymer) composition may, of course, include other additives, e.g. pigments, dyes, heat and light staibilisers, lubricants and fillers.

The glass fiber reinforced phenolic resin composites obtained by the process of our invention have mechanical properties similar to those of glass fiber reinforced polyurethane composites and useful fire resistance. The foamed composites have a particularly desirable combination of rigidity, lightweight and fire resistance, and may be used in or as structural members such as doors, door frames and window frames.

The invention is now illustrated by the following Examples in which all parts are expressed as parts by weight.

EXAMPLE 1

In order to assess the efficiency of various organic compounds as wetting promoters, the static contact angle was measured of a drop of phenolic resin mixture on a flat piece of polished E glass moistened with the organic compound in question.

The nascent foam composition used for these experiments was made by refluxing for 70 to 90 minutes a mixture of 188 parts of phenol, 260 parts of a 37 percent by weight aqueous solution of formaldehyde, and 2.1 parts of sodium hydroxide. The prepolymer so obtained was allowed to cool and water was then stripped off under vacuum until the viscosity of the prepolymer reached about 90 to 100 seconds on the Gardener Holtz scale. 50 parts of this prepolymer were then stirred briefly in a high speed mixer with 0.5 part of a non-ionic surface active agent conventionally used in the production of these foamed resins, 2.0 parts of n-pentane and 7.0 parts of a 50/50 volume mixture of water and a diluent conventionally used with hydrochloric acid in the production of these foamed resins.

A drop of this mixture was placed on a flat polished piece of E glass moistened with the organic compound under examination as a wetting promoter and left for a few minutes to equilibrate, and then the contact angle between the drop and the glass was measured using a travelling microscope fitted with a goniometer eyepiece. Efficient wetting promoters gave small contact angles.

The results obtained with a number of organic compounds are tabulated below.

| Organic Compound | Contact Angle |
|---|---|
| None | 95 |
| Methanol | 7 |
| iso-Propanol | 10 |
| Acetone | 9 |
| Toluene | 17 |
| o-Toluidine | 7 |
| n-Pentane* | 83 |
| Diethyl ether* | 50 |
| Benzene* | 36 |
| n-Hexane* | 60 |

*By way of comparison.

EXAMPLE 2

The method of Example 1 was repeated in three further experiments using as the wetting promoter cumene, isobutanol and isobutyl methyl ketone. The measured contact angles were 10°, about 3° and about 3° respectively. Example 3

A phenolic prepolymer was prepared by refluxing a mixture of 752 parts of phenol with 1,065 parts of a 37 percent by weight aqueous solution of formaldehyde and 8.5 parts of sodium hydroxide for 100 minutes, allowing the mixture to cool to about 40° C and then stripping water off under vacuum until the viscosity was equivalent to 110 seconds on the Gardner-Holtz scale at 25° C and a 100g. sample thereof equilibrated to 25° C had an exotherm such that on mixing with 20g. of a 50/50 volume HCl/water mixture at 25° C its temperature rose to 72° C in 5 minutes.

200 parts of this composition were mixed in a high speed stirrer for about one minute with 5 parts of a non-ionic surface active agent conventionally used in the production of foamed resins from resoles and 16 parts of 1,1,2-trichloro-1,2,2-trifluoroethane. 10 parts of a 50/50 volume mixture of hydrochloric acid (sp.gr.1.18) and a diluent for the acid conventionally used in the production of foamed resins from resoles was then added and the mixture stirred briefly.

Four 33 cm × 8 cm sheets of 0.1 oz/100 sq.in. glass tissue having an epoxy-compatible size were sprayed with a mist of toluene until a weight increase of 11% was obtained and then placed in a rectangular mould measuring 33 cm by 8 cm by 1 cm deep. Some foam mixture was poured on and then four more of the treated sheets were added, more foam mixture poured on, and the process repeated a further eight times, i.e. using 40 sheets of glass tissue in all, to loosely fill the mould. A lid was then clamped in the mould which was placed in an oven at 90° C for an hour to cause the mixture to foam and set. The composite, referred to as Composite A, was then removed from the mould and left overnight in an oven to post cure at 40°C.

A second composite (Composite B) was then made exactly as described above but using glass tissue which had not been sprayed with toluene. This composition used for this composite had a viscosity of 100 seconds (Gardner Holtz scale) and an exotherm equivalent to a temperature rise from 25° C to 49° C in 5 minutes, the amount of blowing agent was reduced to 14 parts and the amount of 50/50 hydrochloride acid/diluent mixture raised to 11 parts.

The efficiency 'A' of the reinforcement obtained from the glass tissue in these composites was derived from the formula.

$$A = E_c - E_m V_m / E_f \cdot V_f$$

where $E_c$, $E_m$ and $E_f$ are the flexural moduli of the composite, the matrix and the glass, and $V_m$ and $V_f$ are the volume fractions of the matrix and glass in the composite.

The volume fraction of glass was calculated by determining the weight and volume of the composite and the weight of glass originally used. The density of the glass fiber was taken to be 2.5g/cc. The flexural moduli of the composites were determined by a three point bending test by supporting the composite on two ½ inch diameter rods spaced 30 cms. apart, applying a load to a third rod resting on the composite exactly half-way between the other two rods, and measuring the deflection of the third rod by means of a dial gauge resting on a flattened portion of the rod. The flexural moduli of several unreinforced foams of different densities were measured and a graph constructed from which could be measured the flexural modulus of the matrix at a desired density. At 0.58 g/cc. this was found to be $6.4 \times 10^9$ dynes/sq.cm. The flexural modulus of the glass fiber in this and the other Examples was taken to be $6.0 \times 10^{11}$ dynes/sq.cm.

The results are tabulated below.

| Composite | Composite density (gm/cc) | Glass content (% by weight) | Composite Flexural Modulus (Dynes/ sq.cm. × $10^{-10}$) | A |
|---|---|---|---|---|
| A | 0.67 | 26.6 | 3.0 | 0.57 |
| B | 0.65 | 22.2 | 1.9 | 0.37 |

EXAMPLES 4–6

The process of Example 3 was repeated in a number of further experiments in which the density of the foam and the nature and concentration of the wetting promoter were varied. The density of the foam was adjusted by varying in known manner the viscosity and exotherm of the prepolymer composition, the amount of hydrochloric/diluent mixture used and the amount and nature of the blowing agent.

The results are tabulated below

| Example | Comparative | 4* | 5* | 6 |
|---|---|---|---|---|
| Viscosity of resin (Gardner Holtz Seconds) | 100 | 88 | 85 | 210 |
| Exotherm of resin (temperature attained in 5 minutes after mixing with HCl/water mixture as described in Example 2). | 49°C | 78°C | 116°C | 52°C |
| Amount of 50/50 HCl/diluent used (ml. per 100 g. of resin) | 5.5 | 5.0 | 5.0 | 8.0 |
| Blowing Agent: Nature | Trichlorotrifluoroethane | | | n-pentane |
| Amount (% by weight of resin) | 7 | 8 | 7 | 7 |
| Wetting promoter: Nature | nil | toluene | isopropanol | isopropanol |
| Amount (% by weight of glass) | — | 42 | 27 | 48 |
| Density of Composite (gm/cc) | 0.65 | 0.65 | 0.56 | 0.52 |
| Glass content (% by weight) | 22.2 | 25.6 | 16.1 | 10.7 |
| Flexural modulus of composition dynes/sq.cm. × $10^{-10}$) | 1.9 | 3.0 | 1.5 | 1.3 |
| Reinforcement Efficiency (A) | 0.37 | 0.61 | 0.45 | 0.40 |

*In Examples 4 and 5, the number of sheets of glass tissue per layer was reduced from four to three.

Improvements in reinforcement efficiency may also be obtained using methanol, acetone and o-toluidine as the wetting promoter.

EXAMPLES 7 AND 8.

The general process of Example 3 was repeated in further experiments but in each layer the 4 sheets of glass tissue were replaced by a single 33 cm. long by 8 cm. wide strip of aligned glass fibers. The 8 cm. wide strip is sold commercially as "Liasil."

The results are tabulated below.

| Example | Comparative | 7 | 8 |
|---|---|---|---|
| Viscosity of resin (Gardner Holtz seconds) | 92 | 180 | 110 |
| Exotherm of resin (as defined in Examples 4–6) | 76°C | 63°C | 72°C |
| Amount of 50/50 HCl/diluent used ml./100 g. of resin | 5.0 | 5.0 | 5.0 |
| Blowing Agent: Nature | trichlorotrifluoroethane | | |
| Amount (% by weight of resin) | 8 | 10 | 11 |
| Wetting Promoter: Nature | nil | toluene | toluene |
| Amount (% by weight of glass) | — | 11 | 34 |
| Density of composite (gm/cc). | 0.68 | 0.72 | 0.70 |
| Glass content (% by weight) | 34.3 | 33.8 | 34.5 |
| Flexural modulus of composite (dynes/sq.cm. × $10^{-10}$) | 8.1 | 8.6 | 8.4 |
| Reinforcement Efficiency (A) | 1.34 | 1.57 | 1.51 |

What we claim is:

1. In a method of forming a glass fiber reinforced phenolic resin composite by forming a composite of glass fibers and uncured resin composition and curing the resin, the improvement which comprises first moistening the glass fibers with an effective amount of a wetting promoter comprising an organic compound having the formula $CH_3X$ where X is —ROH, —RY or —COR′, R is a direct link or an alkylene group having from one to three carbon atoms, R′ is an alkyl group having from one to four carbon atoms and Y is phenyl or o-aminophenyl, the amount of said promoter being in the range of 5 percent to 50 percent by weight of the glass fibers.

2. A method as claimed in claim 1 in which the wetting promoter is volatilised when the resin is cured.

3. A method as claimed in claim 1 in which the uncured resin composition is a nascent foam composition.

4. A method as claimed in claim 3 in which the wetting promoter, when used to moisten a flat surface of E glass, gives a contact angle of from 10° to 20° between a drop of the nascent foam composition and the glass surface.

5. A method as claimed in claim 3 in which the wetting promoter has a boiling point similar to that of the blowing agent in the nascent foam composition.

6. A method as claimed in claim 1 in which the wetting promoter is toluene.

7. A method as claimed in claim 1 in which the wetting promoter is cumene.

8. A method as claimed in claim 1 in which the amount of wetting promoter applied to the glass fiber is from 10 to 25 percent by weight of the fiber.

* * * * *